March 2, 1965     L. M. BENNETT     3,171,990

ELECTRODE ASSEMBLY FOR ELECTROMAGNETIC FLOWMETERS

Filed July 14, 1960

INVENTOR
LEONARD MYER BENNETT
BY
Irwin S. Thompson
ATTORNEY

United States Patent Office 3,171,990
Patented Mar. 2, 1965

3,171,990
ELECTRODE ASSEMBLY FOR ELECTRO-MAGNETIC FLOWMETERS
Leonard Myer Bennett, Rodborough, Stroud, England, assignor to George Kent (Stroud) Limited
Filed July 14, 1960, Ser. No. 42,923
Claims priority, application Great Britain, July 16, 1959, 24,433/59
4 Claims. (Cl. 310—11)

This invention relates to electrode and insulated tube assemblies in which the tube has an insulating lining and in particular, though by no means exclusively, to electrode assemblies for the detector heads of induction flow meters.

The detector head of an induction flow meter normally comprises a short tube adapted to contain the flow of a fluid which is to be measured and a coil assembly arranged to produce a magnetic field laterally across the tube. The tube is insulated from the fluid, usually by means of an internal layer of insulating material, and in accordance with Faraday's law of electromagnetic induction a voltage is induced across the fluid at right angles to both the magnetic field and the direction of flow. This voltage is picked up by two diametrically opposed electrodes which project through the tube wall and are connected to a measuring circuit of the flow meter.

Considerable problems have been met in mounting the electrodes, as it is desirable that their end surfaces in contact with the fluid should be substantially flush with the tube insulation and normally essential that they should be insulated from the tube itself whilst mounted therein in a liquid-tight manner.

According to the invention an electrode assembly for a detector head comprises an electrode with a threaded shank and a head of generally frusto-conical shape which increases in diameter towards its free end, and an insulating bush adapted for mounting in a radial bore through the wall of the detector head, the arrangement being such that tightening of a clamping nut on the electrode shank will draw the electrode into the bush in the manner of an expander cone to expand the bush radially and seal it against the wall of the radial bore.

Electrode assemblies in accordance with the invention are, as will be appreciated, well suited for use not only with induction flow meters but also with the detector heads of such instruments as concentration meters and electrical conductivity measuring instruments.

Preferably the bush has a shoulder adjacent its outer end which during fitting engages the outer surface of the tube of the detector head, in which position the inner end of the bush is conveniently substantially flush with the inner surface of the tube or the insulation thereof when the tube is insulated. The arrangement is preferably such that the bush is finely expanded to seal against the bore in the tube wall when the free end of the electrode head is substantially flush with the inner surface of the insulation. This results in a maximum diameter for the electrode head substantially equal to the outer diameter of the bush, so that the assembly can be inserted in the radial bore from the outside of the tube.

The clamping nut is conveniently used as a terminal nut to clamp a soldering tag between it and the outer end of the bush.

The invention will now be further described with reference to the accompanying drawings which illustrate, by way of example, an electrode assembly in accordance with the invention, and in which.

Figure 1:
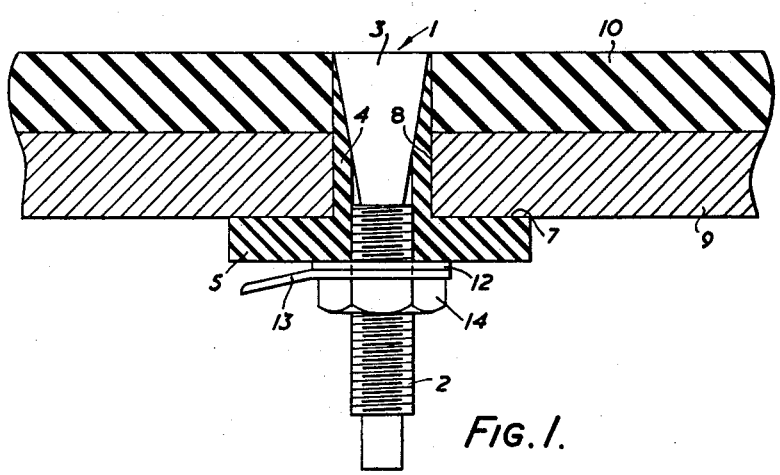
FIGURE 1 is a view of the assembly as fitted in a flow meter detector head.

The assembly comprises an electrode 1 having a threaded shank 2 and a head 3 of frusto-conical shape disposed co-axially with the shank 2 and increasing in diameter towards its free or inner end. This inner end lies in a plane at right angles to the electrode axis and after fitting in the detector head provides the effective electrode surface as shown in FIGURE 1.

Figure 2:
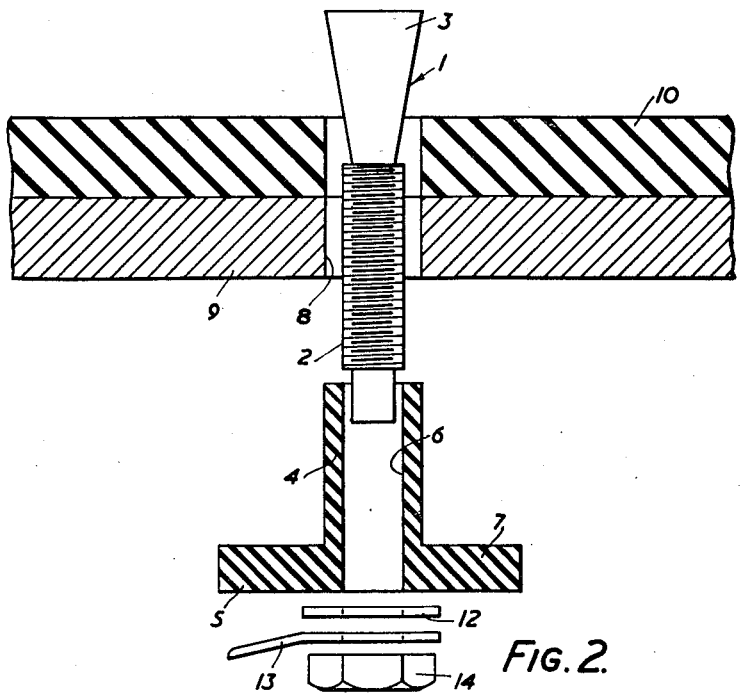
FIGURE 2 is a corresponding exploded view.

An insulating bush 4 of the assembly is of annular shape and has a tubular body with a cylindrical outer surface of the same diameter as the inner end of the electrode head 3 and a radially directed flange 5 at its outer end. As shown in the exploded view of FIGURE 2 the bush 4 has an initially cylindrical central bore 6 which is deformed on fitting to the shape shown in FIGURE 1.

The inner surface 7 of the flange 5 provides a shoulder on the bush 4 adjacent its outer end, and the assembly is mounted in a radial bore 8 through the detector tube 9 in which the outer surface of the body of the bush 4 is a good push fit. The length of the bush 4 from its inner end to the flange 5 is substantially equal to the combined thickness of the detector tube 9 and an insulating lining 10 of the latter, so that when mounted in the radial bore 8 with the shoulder 7 engaging the outer surface of the latter the inner end of the bush 4 is flush with the inner surface of the lining 10.

Before inserting the bush 4 from the outside of the tube 9 the electrode 1 is mounted loosely in the bush 4 with a spring washer 12 and soldering tag 13 mounted on the shank 2 inwardly of a clamping nut 14 threaded on the latter. After the electrode assembly has been inserted in the bore 8 the nut 14 is tightened to draw the electrode 1 into the bush 4 so that the electrode head 3 acts as an expander cone which deforms and expands the wall of the bush 4. The nut 14 is tightened until the inner end of the electrode 1 is flush with the inner end of the brush 4 and the inner surface of the lining 10 (as shown in FIGURE 1) so that it presents no obstruction to flow through the tube 9. Electrical connection to the electrode 1 is made through a lead (which is not illustrated) soldered to the soldering tag.

Deformation of the bush 4 to the final shape shown in FIGURE 1 provides a reliable liquid-tight seal between the bush 4 and the wall of the tube 9 and the lining 10.

It will be clear that the described assembly not only enables the electrode 1 to be rigidly mounted in a liquid-tight manner but also, as a result of the maximum diameter of the electrode head 3 being substantially equal to the outer diameter of the body portion of the bush 4, enables the assembly to be mounted in or withdrawn from the tube 9 entirely from outside the latter. This is particularly advantageous as it allows the electrode 1 to be replaced or withdrawn for inspection or cleaning without disconnecting the complete detector head from a pipeline in which it is mounted.

The words "of generally frusto-conical shape" as used herein and particularly in the following claims with reference to the head of the electrode are intended to include within their scope any shape which increases in diameter progressively towards the inner end of the head and acts as an expander core in the manner described.

What I claim is:

1. An electrode and insulated tube assembly, comprising a tube with an electrically conducting wall and an inner insulating lining, the tube wall and lining having aligned radial bores of a predetermined diameter, an electrode for electrical contact with a liquid flowing along the tube, said electrode having a screw-threaded shank and a head of generally frusto-conical shape which is of an axial length greater than the radial thickness of said lining and increases in diameter towards an adjacent end of the electrode, an insulating bush of deformable material surrounding said electrode and mounted in said radial bores with the inner end of the bush substantially flush with the inner surface of said lining, the overall diameters of the electrode and bush being such that they can be fitted into said radial bores during assembly from outside the tube, and a clamping nut threaded on the electrode shank to draw the electrode head into said bush in the manner of an expander cone to provide a liquid-tight seal between said radial bores and said electrode.

2. An assembly according to claim 1, further comprising a shoulder formed on said bush, which shoulder engages the outer surface of the tube wall.

3. An assembly according to claim 1, further comprising a soldering tag clamped between said nut and said bush.

4. In the detector head of an electro-magnetic induction flow meter which embodies a tube with an electrically conducting wall and an insulating lining, an electrode assembly comprising an electrode with a screw-threaded shank and a head of generally frusto-conical shape increasing in diameter towards its free end which provides an end contact surface for electrical contact with liquid flowing along the tube, said tube wall and lining having aligned radial bores of a predetermined diameter, an insulating bush of deformable material mounted in said radial bores and within which the electrode is mounted, said bush having an inner end portion of hollow substantially cylindrical shape terminating substantially flush with the inner surface of said head and a shoulder engaging the outer surface of said head, and a clamping nut threaded on the shank of said electrode externally of said bush, the arrangement being such that the electrode head has been drawn into the bush in the manner of an expander cone by tightening the clamping nut to expand the bush radially to provide a liquid-tight seal between said radial bores and said electrode.

References Cited in the file of this patent
UNITED STATES PATENTS

| | | |
|---|---|---|
| 1,309,799 | George | July 15, 1919 |
| 1,471,184 | Miles | Oct. 16, 1923 |
| 2,949,551 | Sturgeon | Aug. 16, 1960 |
| 2,957,130 | Dietert et al. | Oct. 18, 1960 |

OTHER REFERENCES

| | | |
|---|---|---|
| 956,971 | France | Feb. 9, 1950 |